(12) United States Patent
Subramanian et al.

(10) Patent No.: US 6,390,569 B1
(45) Date of Patent: May 21, 2002

(54) VEHICLE SOLENOID VALVE

(75) Inventors: Viswanathan Subramanian; Sanjay Manilal Patel, both of El Paso, TX (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/518,942

(22) Filed: Mar. 6, 2000

(51) Int. Cl.[7] .................................................. B60T 8/36
(52) U.S. Cl. .................................. 303/119.2; 303/113.1
(58) Field of Search .......................... 303/119.1, 119.2, 303/119.3, 113.1; 251/129.02, 129.07, 129.15; 137/495, 509

(56) References Cited

U.S. PATENT DOCUMENTS

| | | | | |
|---|---|---|---|---|
| 4,526,203 A | * | 7/1985 | Leiber ...................... | 137/627.5 |
| 5,467,797 A | * | 11/1995 | Seetharaman et al. ...... | 137/599 |
| 5,474,106 A | * | 12/1995 | Burgdorf et al. ............ | 137/495 |
| 5,752,750 A | * | 5/1998 | Lubischer et al. ......... | 303/119.2 |
| 5,934,766 A | * | 8/1999 | Feigel et al. ............. | 303/119.2 |
| 5,984,261 A | * | 11/1999 | Akita .......................... | 251/127 |
| 6,120,003 A | * | 9/2000 | Lubischer et al. ...... | 251/129.02 |
| 6,152,420 A | * | 11/2000 | Hohl ....................... | 251/129.02 |

* cited by examiner

Primary Examiner—Paul N. Dickson
Assistant Examiner—Xuan Lan Nguyen
(74) Attorney, Agent, or Firm—Margaret A. Dobrowitsky

(57) ABSTRACT

A vehicle solenoid valve includes a coil case with a plunger housing disposed therein. The plunger housing establishes a first fluid communication path and a second fluid communication path. Reciprocably disposed within the plunger housing is a plunger. The plunger is movable between a de-energized configuration wherein fluid communication through the first fluid communication path is permitted and fluid communication through the second fluid communication path is blocked, an energized configuration, wherein fluid communication through the first fluid communication path is blocked and fluid communication through the second fluid communication path is permitted, and a pressure relief configuration, wherein, while the valve is energized, fluid pressure on the plunger surpasses a predetermined pressure level to overcome an opposing magnetic force on the plunger and permit fluid communication through the first fluid communication path.

22 Claims, 1 Drawing Sheet

VEHICLE SOLENOID VALVE

TECHNICAL FIELD

The present invention relates to devices used to control the flow of fluid through vehicle fluid systems, such as a vehicle anti-lock brake system.

BACKGROUND OF THE INVENTION

For safety concerns, many of today's vehicles are equipped with anti-lock brake systems (ABS). An ABS maintains vehicle control during extreme braking by electronically sensing when the wheels are just about to lock up and releasing the brakes before lock up occurs. An ABS is capable of modulating the pressure in the wheel cylinders in order to keep the wheels from slipping on the roadway during harsh braking conditions. An extension of the ABS is traction control, whereby sufficient traction is maintained between the driving surface and the vehicle by selectively applying ABS without driver input.

In general, a typical anti-lock brake system can include several solenoid valves to control the hydraulic fluid pressure in the individual components, e.g., a master cylinder, a plurality of wheel cylinders, and a system pump. One such solenoid valve is the traction control solenoid valve. The traction control solenoid valve is normally open to establish fluid communication between the master cylinder and wheel and to block fluid communication between the master cylinder and a hydraulic system pump. On the other hand, the traction control solenoid valve can close under traction control conditions to block fluid communication between the master cylinder and the wheel. When closed, the traction control solenoid valve establishes fluid communication between the master cylinder and a system pump which, in turn, provides fluid pressure to the wheel cylinder to control application of the brakes. If the fluid pressure within the brake line connecting the pump to the wheel cylinder increases beyond a safe limit, the traction control solenoid valve must also serve as a high pressure relief valve in order to provide proper traction control and to prevent damage to the ABS and brake lines.

It is desirable that a traction control solenoid valve be able to serve both functions: blocking fluid communication between the master cylinder and wheel cylinder under traction control conditions, while priming the system pump, and relieving high pressure in the wheel cylinder. However, the present invention further understands that conventional traction control solenoid valves include numerous internal parts in order to provide the necessary fluid flow control which, in turn, increases production time and costs. Moreover, the present invention recognizes that conventional traction control solenoid valves provide high pressure relief by utilizing an internal spring pre-load that can be overcome by high fluid pressure to open the valve. Unfortunately, the present invention recognizes that these spring-based valves provide inconsistent high pressure relief due to variations in the tolerances of the many internal components.

The present invention has recognized these prior art drawbacks, and has provided the below-disclosed solutions to one or more of the prior art deficiencies.

SUMMARY OF THE INVENTION

A vehicle solenoid valve for a vehicle fluid system includes a plunger housing that establishes a first fluid communication path and a second fluid communication path. A plunger is slidably disposed relative to the plunger housing, and the plunger is movable between a de-energized configuration, wherein fluid communication through the first fluid communication path is permitted and fluid communication through the second fluid communication path is blocked, an energized configuration, wherein fluid communication through the first fluid communication path is blocked and fluid communication through the second fluid communication path is permitted, and a pressure relief configuration, wherein, while the valve is energized, fluid pressure on the plunger surpasses a predetermined pressure level to overcome an opposing magnetic force on the plunger and permit fluid communication through the first fluid communication path.

In a preferred embodiment, the plunger defines a proximal end and the valve further includes an armature that forms a central bore. Preferably, the proximal end of the plunger is disposed within the central bore of the armature. Moreover, a coil surrounds the armature and is magnetically coupled thereto. The coil is selectively energizable to urge the armature and, hence, the plunger from the de-energized configuration to the energized configuration. A coil case surrounds the coil and the armature and at least partially surrounds the plunger housing. Also, an armature cup, that has a closed proximal end and an open distal end, surrounds the armature. Preferably, the plunger housing is at least partially disposed within the open distal end of the armature cup.

As intended by the presently preferred embodiment, the plunger housing forms a bore having a first portion and a second portion, and the plunger housing establishes a system pump valve seat between the first portion and second portion of the bore. Furthermore, the plunger defines a distal end, and the plunger is at least partially disposed within the first portion of the bore in the plunger housing. Preferably, the valve includes an integral pin that extends from the distal end of the plunger. The outer diameter of the pin is smaller than the inner diameter of the first portion of the bore, and an annular fluid passage is established between the pin and the plunger housing within the first portion of the bore.

In a preferred embodiment, a valve fitting is disposed within the second portion of the plunger housing bore. The valve fitting defines a first portion and a second portion, with a spring contact face being established therebetween. The valve fitting also forms a wheel cylinder fluid passage circumscribed by a wheel cylinder valve seat. Preferably, the plunger housing forms at least one master cylinder port and at least one system pump port. The first fluid communication path is established by the master cylinder port and the wheel cylinder fluid passage when the valve is in the de-energized configuration. On the other hand, the second fluid communication path is established by the master cylinder port, the annular fluid passage, and the system pump port when the valve is in the energized configuration.

In a preferred embodiment, the valve also includes a plunger ball that contacts the distal end of the pin. The plunger ball engages the system pump valve seat to block fluid communication between the master cylinder port and the annular fluid passage when the valve is deenergized. Also, the ball engages the wheel cylinder valve seat to block fluid communication between the master cylinder port and the wheel cylinder fluid passage when the valve is energized.

In another aspect of the present invention, a valve for a vehicle includes a coil case. An armature cup that has an open end and a closed end is disposed within the coil case, and a plunger housing extends from the open end of the armature cup. The plunger housing establishes a first fluid communication path and a second fluid communication path. In this aspect of the present invention, an armature that forms a bore is reciprocably disposed within the armature cup between the plunger housing and the closed end of the armature cup. A plunger is slidably disposed within the plunger housing. The plunger defines a proximal end which is disposed within the bore formed by the armature. Moreover, the plunger is movable between a de-energized configuration, wherein fluid communication through the first fluid communication path is permitted and fluid communication through the second fluid communication path is blocked, an energized configuration, wherein fluid communication through the first fluid communication path is blocked and fluid communication through the second fluid communication path is permitted, and a pressure relief configuration, wherein, while the valve is energized, fluid pressure on the plunger surpasses a predetermined pressure level to overcome an opposing magnetic force on the plunger and permit fluid communication through the first fluid communication path. Also, in this aspect of the present invention, a coil closely surrounds the armature cup and is magnetically coupled to the armature. The coil is selectively energizable to urge the armature and, hence, the plunger from the de-energized configuration to the energized configuration.

In yet another aspect of the present invention, a system for stabilizing a vehicle includes a master cylinder, at least one wheel cylinder, a system pump, and a vehicle solenoid valve. The vehicle solenoid valve is in fluid communication with the master cylinder, the wheel cylinder, and the system pump. Moreover, the vehicle solenoid valve selectively directs hydraulic brake fluid between the master cylinder and the wheel cylinder and between the master cylinder and the system pump. As intended by this aspect of the present invention, when fluid pressure surpasses a predetermined pressure level, an opposing magnetic force generated by an energized coil is overcome to relieve the pressure.

The present invention will now be described, by way of example, with reference to the accompanying drawings, in which:

DESCRIPTION OF AN EMBODIMENT OF THE INVENTION

Figure 1:
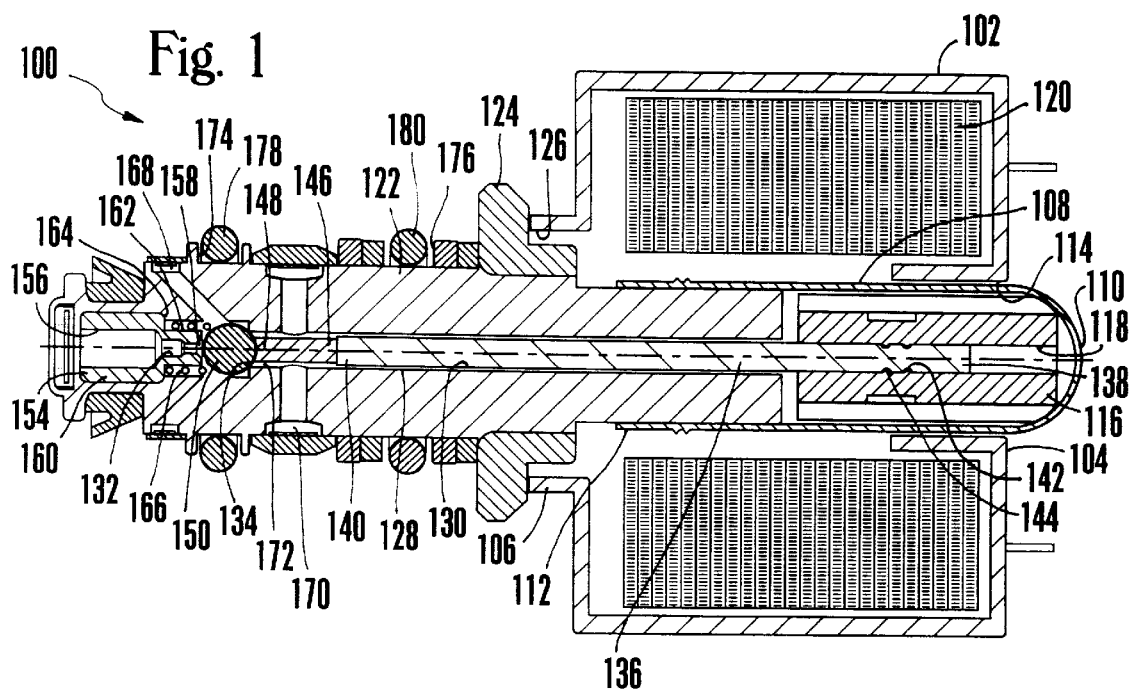
FIG. 1 is a cross-sectional view of the valve in the de-energized configuration.
Figure 2:
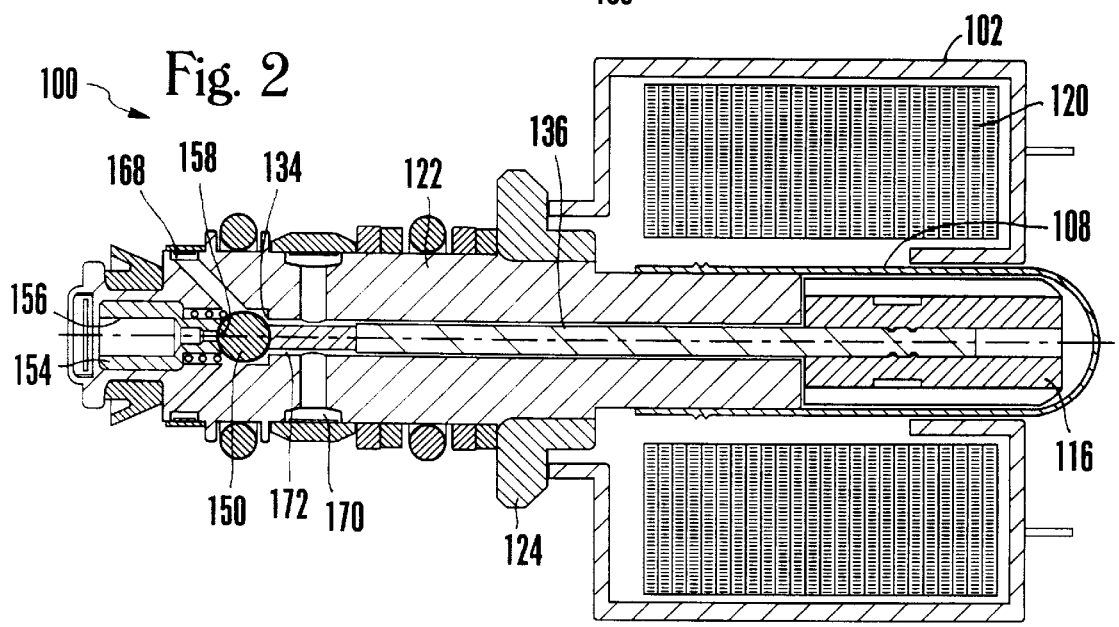
FIG. 2 is a cross-sectional view of the valve in the energized configuration.

Referring initially to FIGS. 1 and 2, a vehicle solenoid valve is shown and generally designated 100. FIGS. 1 and 2 show that the vehicle solenoid valve 100 includes a preferably metal, hollow, generally cylindrical coil case 102 defining a proximal end 104 and a distal end 106.

Within the coil case 102 is a preferably metal, generally tubular armature cup 108 having an closed proximal end 110 and an open distal end 112. As shown in FIGS. 1 and 2, the proximal end 104 of the coil case 102 is formed with a hole 114 that is sized to receive the armature cup 108. In a preferred embodiment, the armature cup 108 is slidably disposed the hole 114 such that the close proximal end 110 of the armature cup 108 protrudes from the coil case 102 and the rest of the armature cup 108 extends into the interior of the coil case 102.

Continuing the description of the valve 100, an armature 116 is reciprocably disposed within the armature cup 108. FIGS. 1 and 2 show that the armature 116 is formed with a central bore 118 that receives the proximal end of a plunger, described below. A hollow toroidal coil 120 closely surrounds the armature cup 108 and is magnetically coupled to the armature 116. Extending from the open distal end 112 of the armature cup 108 is a preferably metal, generally cylindrical plunger housing 122. A preferably metal, generally ring-shaped support flange 124 circumscribes the plunger housing 122. As intended by the presently preferred embodiment, the support flange 124 is press fitted around the plunger housing 122 near the middle of the plunger housing 122. The support flange 124 is engaged along its outer periphery with a hole 126 formed in the distal end 106 of the coil case 102 to support the plunger housing 122 and enclose the hole 126 in the distal end 106 of the coil case 102.

Referring still to FIGS. 1 and 2, the plunger housing 122 is formed with a central bore 128 having a relatively narrow first portion 130 that expands into a larger second portion 132. A system pump valve seat 134 circumscribes the central bore 128 in the plunger housing 122 at the interface between the first portion 130 and the second portion 132 of the bore 128. Reciprocably disposed within the first portion 130 of the bore 128 is a preferably metal, generally cylindrical plunger 136 that defines a proximal end 138 and a distal end 140. In a preferred embodiment, the proximal end 138 of the plunger 136 is formed with staking 142 and the bore 118 within the armature 116 is formed with opposing staking 144. Thus, the staking 142 on the plunger 136 engages the opposing staking 144 within the armature 116 to key the plunger 136 to the armature 116. It is to be understood that consequently, as the armature 116 reciprocates within the armature cup 108, the plunger 136 reciprocates within the plunger housing 116.

FIGS. 1 and 2 show a pin 146, having a distal end 148, extends from the distal end 140 of the plunger 136 and a preferably metal, plunger ball 150 contacts the distal end 148 of the pin 146. The pin 146 can be made integrally with the plunger 136. It is to be appreciated that the plunger ball 150 can be integrally formed with the pin 146. The plunger ball 150 selectively engages the system pump valve seat 134 and a wheel cylinder valve seat, described below, to control fluid communication through the solenoid valve 100. Moving to the far left of FIGS. 1 and 2, a preferably metal, generally cylindrical valve fitting 154 is preferably press fitted into the second portion 132 of the bore 128. FIGS. 1 and 2 show that the valve fitting 154 is formed with a wheel cylinder fluid passage 156 that provides fluid communication from the solenoid valve 100 to a wheel cylinder, described below. The wheel cylinder fluid passage 156 in the valve fitting 154 is circumscribed by a wheel cylinder valve seat 158 that can be selectively engaged by the plunger ball 150 for purposes to be disclosed shortly.

FIGS. 1 and 2 also show that the valve fitting 154 includes an enlarged first portion 160 that terminates at a narrow second portion 162. A spring contact face 164 is established where the first portion 160 of the valve fitting 154 meets the second portion 162 of the valve fitting 154. A spring 166 is installed in compression around the second portion 160 of the valve fitting 154 between the spring contact face 164 and the plunger ball 150.

As intended by the present invention, the plunger housing 122 is formed with at least one master cylinder port 168 that provides fluid communication between a master cylinder, described below, and the solenoid valve 100. Moreover, the plunger housing 122 is formed with at least one system pump port 170 that provides fluid communication between the solenoid valve 100 and a system pump, also described below. Preferably, two master cylinder ports 168 and two system pump ports 170 are provided.

FIGS. 1 and 2 show that the outer diameter of the pin 146 is substantially smaller than the inner diameter of the first portion 130 of the bore 128 formed in the plunger housing 122. As such, an annular fluid passage 172 is established between the pin 146 and the plunger housing 122. When the plunger ball 150 is distanced from the system pump valve seat 134, the annular fluid passage 172 provides fluid communication between the master cylinder ports 168 and the system pump ports 170.

FIGS. 1 and 2 further show that the plunger housing 116 is circumscribed by a first o-ring groove 174 and a second o-ring groove 176. As shown, the first o-ring groove 174 is sized to receive a first o-ring 178 and the second o-ring groove 176 is sized to receive a second o-ring 180.

Figure 3:
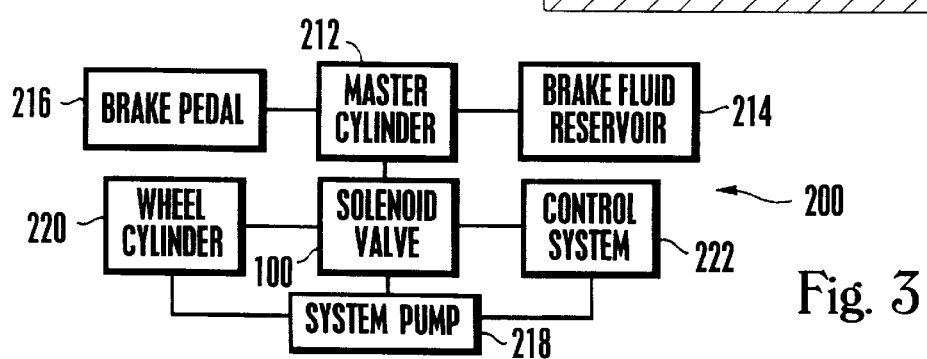
FIG. 3 is a block diagram representing a brake system in which a vehicle solenoid valve may be installed.

To understand the use of the valve of the present invention, reference is now made to FIG. 3, which shows an exemplary vehicle brake system, generally designated 200, in which the present valve can be used. As shown, the system 200 includes a master cylinder 212 in fluid communication with a fluid reservoir 214. The master cylinder 212 is mechanically actuated by a brake pedal 216 that is depressed by the foot of a driver. Installed between the master cylinder 212 and a fluid pump 218, and in fluid communication with both, is the vehicle solenoid valve 100.

FIG. 3 shows that the vehicle solenoid valve 100 and the system pump 218 are each also in fluid communication with a wheel cylinder 220. A control system 222, e.g., an antilock brake system, is electrically connected to the solenoid valve 100 and the system pump 218.

Under normal braking conditions, i.e., with the coil 120 is de-energized, when the brake pedal 216 is depressed by a driver, the solenoid valve 100 permits fluid communication from the master cylinder 212 to the wheel cylinder 220. Specifically, the ball 150 mates with the system pump valve seat 134 such that fluid can flow from the master cylinder ports 168 to the wheel cylinder fluid passage 156. However, when one or more wheels start to lose traction, the solenoid valve 100 is automatically energized such that the ball 150 is against the wheel cylinder valve seat 158 to block fluid communication between the master cylinder 212 and the wheel cylinder 220, while permitting fluid communication from the master cylinder 212 to the system pump 218. Accordingly, fluid is delivered to the system pump 218 in order to prime it. Once primed, the pump 218 may pump fluid directly to the wheel cylinder 220 and in accordance with ABS principles, control the stability of the vehicle.

As long as the coil 120 remains energized, the valve 100 remains in the energized configuration as shown in FIG. 2. If, while in the solenoid valve 100 is in the energized configuration, the fluid pressure in the wheel cylinder 220 surpasses a predetermined critical level, the hydraulic pressure against the plunger ball 150 can overcome the magnetic force and urge the plunger ball 150 to the right, looking down on FIG. 2, to a pressure relief configuration, wherein the plunger ball 150 is distanced from the wheel cylinder valve seat 158 to permit fluid communication from the wheel cylinder to the master cylinder 212. Once the pressure in the wheel cylinder 220 falls below the critical pressure level and the magnetic force exceeds the hydraulic force, the valve 100 will return to the closed configuration until the coil 120 is de-energized by the control system 222 and the spring 166 urges the valve 100 into the de-energized configuration shown in FIG. 1.

It is to be understood that when the valve 100 is in the de-energized configuration, a first fluid communication path is established by the master cylinder ports 168 and the wheel cylinder fluid passage 156. On the other hand, when the valve is in the energized configuration, a second fluid communication path is established by the master cylinder ports 168, the annular fluid passage 172 and the system pump ports 170, provide the pressure in the wheel cylinder 220 does not increase beyond a predetermined critical level.

With the configuration of structure described above, it is to be appreciated that the vehicle solenoid valve 100 does not require many internal components to control the fluid communication between the master cylinder 212, the wheel cylinder 220, and the system pump 218. Moreover, by having the magnetic force of attraction between the plunger housing 122 and armature 132 (due to energization of the coil 120) control the pressure relief function, the valve 100 more consistently provides this function.

While the particular vehicle solenoid valve as herein shown and described in detail is fully capable of attaining the above-described objects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it is to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. section 112, sixth paragraph, unless the element is expressly recited using the phrase "means for."

What is claimed is:

1. A vehicle solenoid valve for a vehicle fluid system, comprising:

a plunger housing establishing a first fluid communication path and a second fluid communication path;

one and only one plunger ball within the housing; and a plunger slidably disposed relative to the plunger housing, the plunger contacting the plunger ball, the plunger being movable between a de-energized configuration, wherein fluid communication through the first fluid communication path is permitted and fluid communication through the second fluid communication path is blocked by the plunger ball, an energized configuration, wherein fluid communication through the first fluid communication path is blocked by the plunger ball and fluid communication through the second fluid communication path is permitted, and a pressure relief configuration, wherein, while the valve is energized, fluid pressure on the plunger ball surpasses a predetermined pressure level to overcome an opposing magnetic force on the plunger and permit fluid communication through the first fluid communication path.

2. The valve of claim 1, wherein the plunger defines a proximal end and the valve further comprises:

an armature forming a central bore, the proximal end of the plunger being disposed within the central bore of the armature; and a coil surrounding the armature and magnetically coupled thereto, the coil being selectively energizable to urge the plunger from the de-energized configuration to the energized configuration.

3. The valve of claim 2, further comprising:

a coil case surrounding the coil and the armature, the coil case at least partially surrounding the plunger housing.

4. The valve of claim 2, further comprising:

an armature cup surrounding the armature, the armature cup having a closed proximal end and a open distal end, the plunger housing being at least partially disposed within the open distal end of the armature cup.

5. The valve of claim 1, wherein the plunger housing forms a bore having a first portion and a second portion, and the plunger housing establishes a system pump valve seat between the first portion and second portion of the bore.

6. The valve of claim 5, wherein the plunger defines a distal end, the plunger is at least partially disposed within the first portion of the bore in the plunger housing and the valve further comprises:

a pin extending from the distal end of the plunger, the outer diameter of the pin being smaller than the inner diameter of the first portion of the bore in the plunger housing such that an annular fluid passage is established between the pin and the plunger housing within the first portion of the bore in the plunger housing.

7. The valve of claim 6, further comprising:

a valve fitting disposed within the second portion of the bore within the plunger housing, the valve fitting defining a first portion, a second portion and establishing a spring contact face therebetween, the valve fitting forming a wheel cylinder fluid passage circumscribed by a wheel cylinder valve seat.

8. The valve of claim 7, wherein the plunger housing forms at least one master cylinder port and at least one system pump port, the first fluid communication path being established by the master cylinder port and the wheel cylinder fluid passage when the valve is in the de-energized configuration, the second fluid communication path being established by the master cylinder port, the annular fluid passage, and the system pump port when the valve is in the energized configuration.

9. The valve of claim 8, wherein the pin defines a distal end that contacts the plunger ball, the plunger ball selectively engaging the system pump valve seat to block fluid communication between the master cylinder port and the annular fluid passage, the plunger ball selectively engaging the wheel cylinder valve seat to block fluid communication between the master cylinder port and the wheel cylinder fluid passage in the valve fitting.

10. A valve for a vehicle comprising:

a coil case;

an armature cup disposed within the coil case, the armature cup having an open end and a closed end;

a plunger housing extending from the open end of the armature cup, the plunger housing establishing a first fluid communication path and a second fluid communication path;

an armature reciprocably disposed within the armature cup between the plunger housing and the closed end of the armature cup, the armature forming a bore;

one and only one plunger ball disposed within the plunger housing; and a plunger slidably disposed in the plunger housing the plunger contacting the plunger ball, the plunger defining a proximal end, the proximal end of the plunger being disposed within the bore formed in the armature, the plunger being movable between a de-energized configuration, wherein fluid communication through the first fluid communication path is permitted and fluid communication through the second fluid communication path is blocked by the plunger ball, an energized configuration, wherein fluid communication through the first fluid communication path is blocked by the plunger ball and fluid communication through the second fluid communication path is permitted, and a pressure relief configuration, wherein, while the valve is energized, fluid pressure on the plunger surpasses a predetermined pressure level to overcome an opposing magnetic force on the plunger and permit fluid communication through the first fluid communication path; and a coil closely surrounding the armature cup and magnetically coupled to the armature, the coil being selectively energizable to urge the plunger from the de-energized configuration to the energized configuration.

11. The valve of claim 10, wherein the plunger housing forms a bore having a first portion and a second portion, and the plunger housing establishes a system pump valve seat between the first portion and second portion of the bore.

12. The valve of claim 11, wherein the plunger defines a distal end, the plunger being at least partially disposed within the first portion of the bore in the plunger housing and the valve further comprises:

a pin extending from the distal end of the plunger, the outer diameter of the pin being smaller than the inner diameter of the first portion of the bore in the plunger housing such that an annular fluid passage is established between the pin and the plunger housing within the first portion of the bore in the plunger housing.

13. The valve of claim 12, further comprising:

a valve fitting disposed within the second portion of the bore within the plunger housing, the valve fitting defining a first portion, a second portion and establishing a spring contact face therebetween, the valve fitting forming a wheel cylinder fluid passage circumscribed by a wheel cylinder valve seat.

14. The valve of claim 13, wherein the plunger housing forms at least one master cylinder port and at least one system pump port, the first fluid communication path being established by the master cylinder port and the wheel cylinder fluid passage when the valve is in the de-energized configuration, the second fluid communication path being established by the master cylinder port, the annular fluid passage, and the system pump port when the valve is in the energized configuration.

15. The valve of claim 14, wherein the pin defines a distal end, and the valve further comprises:

a plunger ball contacting the distal end of the pin, the plunger ball selectively engaging the system pump valve seat to block fluid communication between the master cylinder port and the annular fluid passage, the plunger ball selectively engaging the wheel cylinder valve seat to block fluid communication between the master cylinder port and the wheel cylinder fluid passage in the valve fitting.

16. A system for stabilizing a vehicle comprising:

a master cylinder;

at least one wheel cylinder;

a system pump; and a vehicle solenoid valve in direct fluid communication with the master cylinder, the wheel cylinder, and the system pump, the solenoid valve selectively directing hydraulic brake fluid between the master cylinder and the wheel cylinder and between the master cylinder and the system pump, wherein when fluid pressure surpasses a predetermined pressure level, an opposing magnetic force is overcome to relieve the pressure.

17. The system of claim 16, further comprising: a fluid reservoir in fluid communication with the master cylinder.

18. The system of claim 16, further comprising: a brake pedal mechanically coupled to the master cylinder.

19. The system of claim 16, further comprising:

a control system electrically coupled to the solenoid valve and the system pump.

20. The system of claim 19, wherein the vehicle solenoid valve comprises:

a plunger slidably disposed relative to the plunger housing, the plunger being movable between a de-energized configuration, wherein fluid communication through the first fluid communication path is permitted and fluid communication through the second fluid communication path is blocked, an energized configuration, wherein fluid communication through the first fluid communication path is blocked and fluid communication through the second fluid communication path is permitted, and a pressure relief configuration, wherein fluid pressure on the plunger surpasses a predetermined pressure level to overcome an opposing magnetic force on the plunger and permit fluid communication through the first fluid communication path.

21. The system of claim 20, wherein the plunger defines a proximal end and the valve further comprises:

an armature forming a central bore, the proximal end of the plunger being disposed within the central bore of the armature; and a coil surrounding the armature and magnetically coupled thereto, the coil being selectively energizable to urge the plunger from the de-energized configuration to the energized configuration.

22. The system of claim 21, wherein the valve further comprises:

a coil case surrounding the coil and the armature, the coil case at least partially surrounding the plunger housing.

* * * * *